Nov. 25, 1952     M. GEDDES     2,619,014
LENS BOARD CONTROL MEANS FOR STUDIO CAMERAS
Filed April 1, 1949     2 SHEETS—SHEET 1

INVENTOR.
MADISON GEDDES
BY Hudson, Boughton,
Williams, David & Hoffmann.
ATTORNEYS Nov. 25, 1952 M. GEDDES 2,619,014
LENS BOARD CONTROL MEANS FOR STUDIO CAMERAS
Filed April 1, 1949 2 SHEETS—SHEET 2

INVENTOR.
MADISON GEDDES
BY Hudson, Boughton,
Williams, David & Hoffmann.
ATTORNEYS Patented Nov. 25, 1952

2,619,014

UNITED STATES PATENT OFFICE 2,619,014

LENS BOARD CONTROL MEANS FOR STUDIO CAMERAS

Madison Geddes, Lakewood, Ohio

Application April 1, 1949, Serial No. 84,977

4 Claims. (Cl. 95—50)

The present invention relates to cameras and, more particularly, to studio cameras primarily intended for use by professional photographers for making portraits and the like.

Cameras of the type presently used by professional photographers primarily for making portraits are usually relatively large and because of their size are difficult to focus, etc., bearing in mind the fact that the focusing is accomplished upon a ground glass which the photographer views from the rear of the camera, usually underneath a black cloth used to exclude light and thus make the image appear brighter. The conditions just referred to limit not only the adjustments normally built into these cameras but also the adjustments that the photographer can make conveniently and, in turn, detracts from the quality of his work.

The principal object of this invention is the provision of a novel and improved camera of the character referred to which in addition to not having the disadvantages referred to includes adjustments not normally present in prior art cameras of the type referred to and which will facilitate the work of the photographer and enable him to make better pictures.

Another object of the invention is the provision of a novel and improved camera of the character referred to so constructed and arranged that the lens or lens holder may be pivoted about two axes at right angles to each other from a position adjacent to the rear of the camera and within easy and convenient reach of the photographer while focusing or viewing the image to be photographed upon a ground glass at the rear of the camera.

The invention resides in certain constructions and combinations and arrangements of parts and further objects and advantages of the invention will be apparent to those skilled in the art to which it relates from the following description of the preferred embodiment described with reference to the accompanying drawings forming a part of this specification in which similar reference characters designate corresponding parts throughout the several views, and in which Fig. 1 is a perspective, front view of a camera embodying the present invention;

Figure 1:
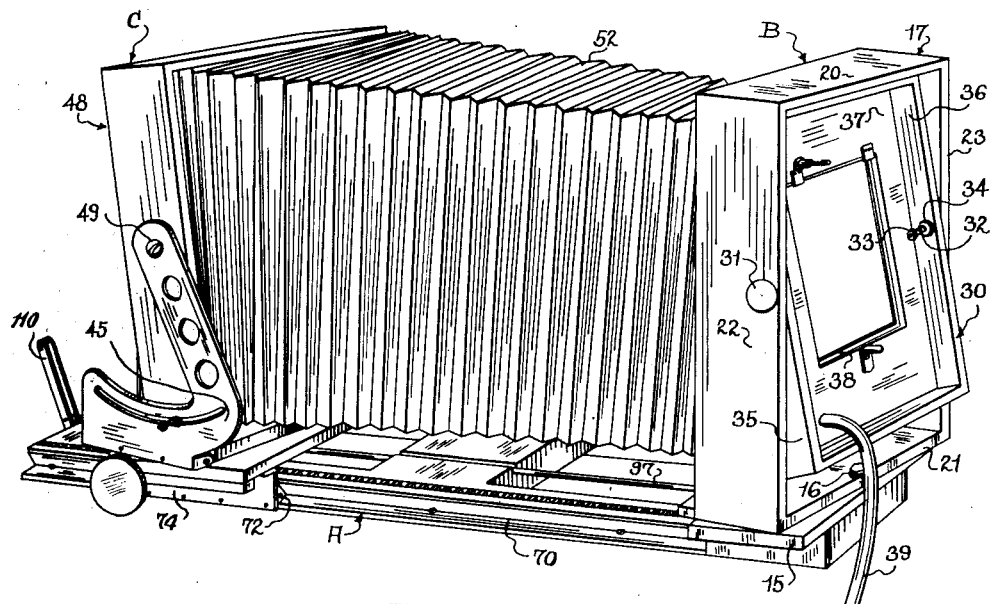
Figure 2:
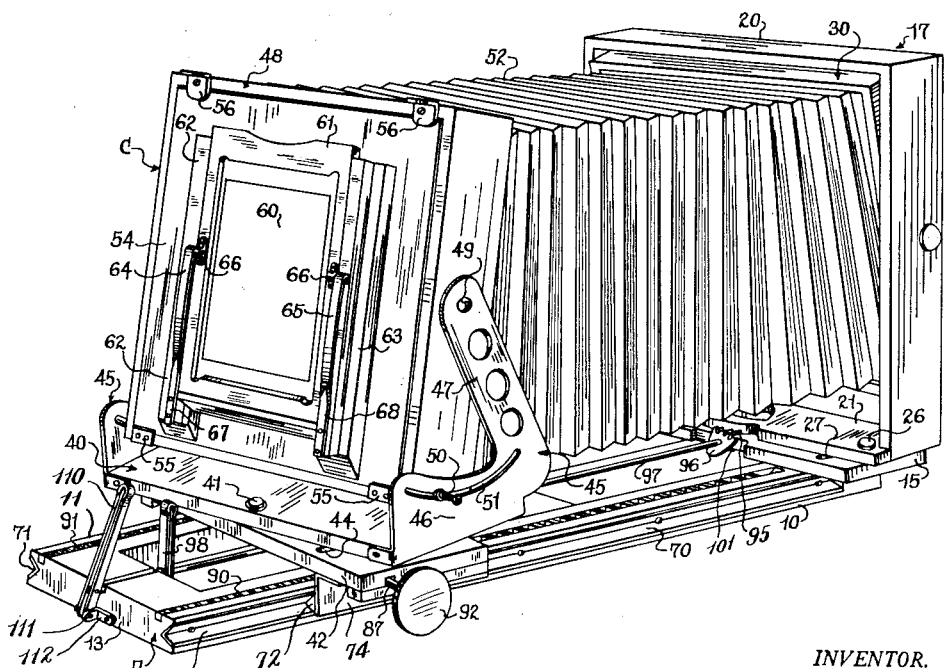
Fig. 2 is a perspective, rear view of the camera shown in Fig. 1.
Figures 3, 4, 5:
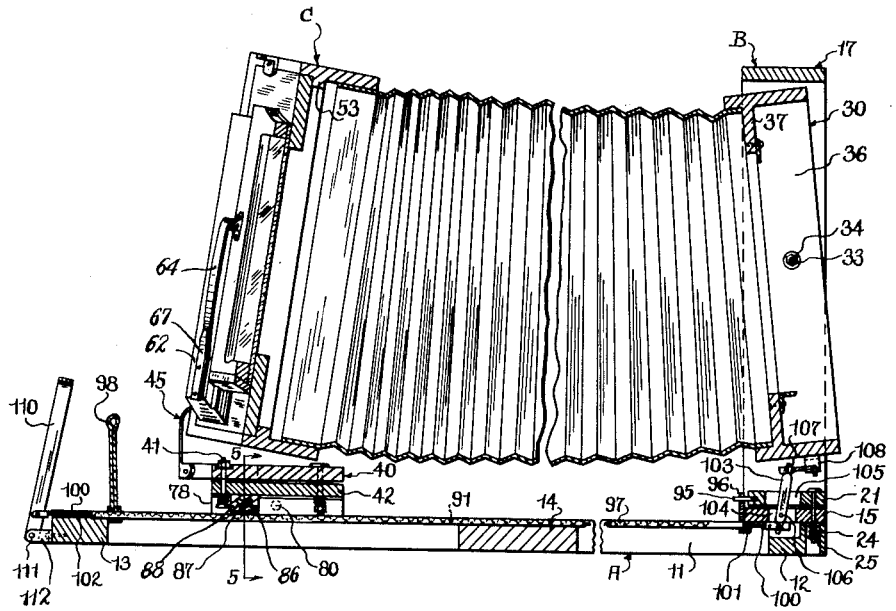
Fig. 3 is a fragmentary, longitudinal, vertical, central, sectional view of the camera, with the parts in the position shown in Fig. 2.
Fig. 4 is a detail view of the plate-holding mechanism.
Fig. 5 is a fragmentary, sectional view approximately on the line 5—5 of Fig. 3.

Generally speaking, the camera of the present invention comprises a base or track having at its front end a front lens-carrying assembly, so constructed that a lens carried thereby can be oscillated or adjusted about two axes at right angles to each other and at the nodal point of the lens. Behind the front or lens-carrying assembly and adjacent to the rear of the base or track is a rear or plate-carrying assembly slidably carried by the track for movement toward and from the front or lens-carrying asembly and connected to the tilting front by a bellows of conventional construction. Like the front or lens-carrying assembly, the rear or plate-carrying assembly is so constructed that a plate carried thereby may be adjusted about two axes at right angles to each other and generally parallel with the axis about which the lens can be adjusted. In addition, the camera includes means accessible at the rear of the camera for manipulating the front or lens-carrying assembly to adjust a lens carried thereby about the two axes referred to Referring to the drawings which show, for purposes of illustration only, a particular camera constructed according to and embodying the present invention, the reference character A designates generally a base or track comprising two side members 10, 11 connected together by end members 12, 13 and a center member 14. The base A may be made of wood, metal, plastic, or any other suitable material. Adjacent to the front end of the base A is a front or lens-carrying assembly, designated generally by the reference character B, and comprising a rectangularly-shaped plate-like member 15 connected to the front of the base A, as by screws, bolts, or the like. Pivotally connected to the member 15, as by a bolt 16, is a square, tubular collar or frame-like member 17 having top and bottom parts 20, 21, respectively, connected by side parts 22, 23. The bolt 16 projects through suitably aligned holes in the bottom member 21 of the frame-like member 17 with its lower end extending into an aperture in the front of the cross member 12. The lower end of the bolt 16 is preferably surrounded by a spring 24 interposed between the nut 25 thereon and the underside of the member 15 to securely hold the parts together while permitting rotation or swinging movement of the frame-like member 17 relative to the member 15 about the bolt 16 as a pivot.

To assist in holding the frame-like member 17 to the member 15 and to help guide it in its movement upon the member 15, the bottom part 21 of the frame-like member 17 is provided with a pair of large headed, bolt-like fastener members 26 projecting through suitable holes, one located adjacent to either of the sides 22, 23 of the frame-like member 17. The fastener members 26 project through arcuate slots 27 in the member 15 to the outside of the support or base A, which support is slightly narrower than the member 15 is long. Beneath the member 15, the members 26 are provided with small springs surrounding their lower ends and interposed between nuts on their lower ends and washers engaging the underside of the member 15. The springs are so adjusted that the fasteners 26 help to steady the frame-like member 17 on the member 15 while permitting rotation thereof about the bolt 16 as a pivot and assist in holding the member 17 in any adjusted position.

In addition to the frame-like member 17, the front or lens-carrying assembly B comprises a slightly smaller, but similarly constructed, swinging front or frame-like member 30 located within the collar or frame-like member 17 and pivotally connected thereto for rotation about a generally horizontal axis by large headed fasteners 31. The fasteners 31 are similar to the fasteners 26, previously referred to, and their inner ends are surrounded by springs 32 interposed between nuts 33 thereon and washers 34 abutting the inside walls of the side members or parts 35, 36 of the inner, rectangular, frame-like member 30. Washers surrounding the fasteners 31 and interposed between the side members 22, 23 and 35, 36 of the frame-like members 17, 30, hold the members in properly spaced relation. The member or frame 30 is provided with a partition 37 fixedly secured therein and having a suitable opening 38 for the reception of a lens assembly, not shown. The opening 38 is of the usual size and shape to receive the lens board of a lens assembly of conventional character which is held therein in the usual manner. The shutter of the lens assembly is operated in the conventional manner by the usual bulb and tube mechanism 39 adjacent to the rear of the base or support A is a rear or plate-holding assembly C comprising a rectangular, plate-like member 40 pivotally connected, as by a bolt-like fastener 41 to a rectangular, plate-like member 42 corresponding to the plate-like member 15 of the front assembly B. The fastener 41 is, in all respects, similar to the fastener 16 and projects through suitably aligned apertures in the members 40, 42. Large headed fastener members 43, similar to the members 26 previously described, and one located at either side of the pivot 41, assist in holding the parts 40, 42 assembled while permitting relative rotation or swinging movement therebetween about the pivot 41. The fasteners 43 project through suitable arcuate slots 44 in the member 42 in the same manner as the fasteners 26 project through the slots 27 and their lower ends are provided with washers, springs and nuts in a similar manner. In addition to the functions previously referred to, the springs, etc., yieldably hold the parts 40, 42 in any position to which they may be moved or adjusted.

Both ends of the member 40 are provided with angularly-shaped brackets 45 preferably made of metal and fixedly secured thereto as by screws. Each of the brackets 45 comprises a horizontal portion 46 and a vertical portion 47 extending upwardly and rearwardly from the front end of the horizontal portion 46. The brackets 45 form a support for a rectangularly-shaped, tubular, frame-like tilting back 48 somewhat similar but preferably slightly larger than the tilting front 30. The tilting back 48 is pivotally connected to the brackets 45, in a manner similar to that in which the member 30 is pivoted to the member 17, by fastener members 49 similar to the fastener members 31 except for the fact that the fastener members 49 have small, slotted, round heads instead of large, flat heads.

The tilting back 48 is adapted to be rotated about the fasteners 49 as pivots and is normally yieldably retained in any adjusted position by fasteners 50 similar in construction to the fasteners 49. The fasteners 50 have their heads within the frame-like member 48 and project outwardly through suitable holes in the sides of the member 48, within which holes they are tightly held. From the member 48 the fasteners 50 project outwardly through arcuate slots 51 in the horizontal parts 46 of the brackets 45 where they are provided with washers, springs and nuts. The construction permits movement or tilting of the back 48 about the fasteners 49 as pivots within the limits of the slots 51 and yieldably retains the member 48 in any position to which it is moved or adjusted.

The collar-like tilting members 30, 48 are connected together by a bellows 52 of conventional construction, opposite ends of which are connected to the respective members in a suitable manner as by being glued thereto. The member 48 is provided with an internal flange 53 intermediate its ends and against which a block plate 54 is adapted to rest with its rear surface flush with the rear edge of the member 48. The bottom, rear edge of the member 48 is provided with a pair of metal clips 55 between the upper ends of which and the flange 53 adjacent thereto the lower end of the back plate 54 engages to hold it in position. The upper end of the back plate 54 is removably held in the member 48 by a pair of rotatable metal catches 56 secured to the top part of the member 48 and rotatable to an inoperative position to permit removal of the back plate 54.

The back plates 54 which carry the photographic plate in a plate holder and the ground glass used in focusing the camera is made removable as is the usual construction so that it can be replaced by one of a different size when different sizes of photographic plates are to be used. As shown, the ground glass 60 is fixed to the front or inside of a rectangular, frame-like member 61 removably positioned between two side members 62, 63 on the back plate 54. The adjoining side edges of the frame 61 and the members 62, 63 have overlapping flanges to provide an improved light seal when the camera is being focused.

The frame-like member 61 is movably attached to the back plate 54 by a pair of relatively long leaf springs 64, 65, one connected to either side of the frame. The leaf springs 64, 65 which are located to the outside of the frame member 61, so as not to interfere unnecessarily with its movement, have their lower ends fixed to the rear surfaces of the side members 62, 63 below the frame member 61, which surfaces are normally flush with the rear surface of the frame member 61. The upper end of the springs 64, 65 are pivotally connected to opposite sides of the frame 61 midway between the top and bottom thereof by pintle pins projecting through suitable eyes on the upper ends of the spring and fixed in apertures aligned therewith in brackets 66 fixed to the side members of the frame 61. The leaf springs 64, 65 may be reinforced by short leaf springs 67, 68, if desired.

The construction just described is such that a photographic plate-holder D may be readily inserted from the top, behind or underneath the frame or member 61 by first pulling the upper end of the member 61 away from the back 54 sufficient to permit the lower end of the plate holder to be inserted between the two members and thereafter pushing the plate-holder down in front of the member 61. The plate-holder can be readily removed, when desired, by pushing it upwardly from below until it can be grasped from above and withdrawn. Due to the great relative length of the springs 64, 65, the member 61 is relatively free and has considerable movement relative to the back 54, thus facilitating insertion and removal of the plate holder D.

The rear or plate-holding assembly C is carried by the base or track A for movement or adjustment toward and from the front or lens-holding assembly B. As shown, the outer edges of the side members 10, 11 of the base A are provided or formed with V-ways 70, 71 engaged by complementary V-shaped members 72, 73 carried by angle brackets 74, 75 connected to the underside of the plate-like member 42 and which hold the plate-like member 42 slightly above the support A. The base A shown is made of wood as are many of the other parts of the camera shown, and the V-ways 70, 71 are formed by metal strips attached to the side members 10, 11. The angle brackets 74, 75 are somewhat flexible and the V-shaped members 72, 73 are held in engagement with the ways 70, 71 on the base A by springs 78, 79 supported on opposite ends of a transversely extending rod 80 projecting through the angle brackets 74, 75 and extending across the base A underneath the plate-like member 42. Opposite ends of the rod 80 are provided with nuts 81 and the springs 78, 79 are interposed therebetween and the brackets 74, 75 and firmly but yieldably hold the members 72, 73 in the guides 70, 71.

The rear assembly C is adapted to be moved along the base or track A toward and from the front assembly B by a pair of gear wheels 85, 86 fixed to a transversely extending shaft 87 projecting through and rotatably supported in a block-like member 88 secured to the underside of the member 42. The gear wheels 85, 86 engage suitable racks 90, 91 inlaid in the upper surface of the support A. The shaft 87 is provided with a knurled hand-wheel 92 to facilitate manual rotation thereof and, in turn, adjustment of the rear assembly C longitudinally of the base A toward and from the front of the camera.

In studio cameras of the character to which the present invention relates, the front or lens-carrying assembly is a considerable distance in front of the rear or plate-carrying assembly and are otherwise of such a size that it is impossible or, at least, very inconvenient for the photographer to view the image on the ground glass 60 while adjusting the lens-holding assembly so as to obtain the proper focus, etc., and the present invention contemplates means located adjacent to the rear of the camera for adjusting the relatively movable parts at the front of the camera so that the photographer can readily adjust the lens about its universal support from a convenient and comfortable position at the rear of the camera.

In the embodiment shown, a portion of the bottom 21 of the outer frame-like member 17 directly behind the pivot 16 is arcuately-shaped and provided with a plurality of pins 95 engaged by a gear-like sector 96 fixed to a longitudinally extending, tubular member 97 adjacent to its front end. The tubular member 97 extends to the rear of the base A where it is provided with an upwardly extending handle 98 to facilitate rotation about its longitudinal axis. The construction is such that the frame-like member 17 may be swung or adjusted about its pivot 16 upon oscillation of the handle 98 and, in turn, the tubular member 97 and the gear sector 96 in the desired manner. As shown, movement of the lever 98 in a clockwise direction, as viewed from the rear, rotates the frame-like member 17 about its pivot in a counterclockwise direction, as viewed from above.

The longitudinally extending, tubular member 97 is rotatably supported upon a longitudinally extending and reciprocable shaft or rod 100 projecting through the tubular member 97 and a suitable bearing member 101 immediately in front of the forward end of the tubular member 97 connected to the underside of a plate-like member 15. The rear ends of the tubular member 97 and the rod 100 lie and are supported in a groove 102 in the upper surface of the cross member 13 of the base A. The forward end of the longitudinally reciprocable rod 100 is pivotally connected to the lower end of a lever 103 projecting upwardly through suitably aligned apertures 104, 105 in the members 15 and 21 of the front assembly B. The lever 103 is pivotally supported in the member 15 by a pivot pin 106 fixed in the member 15 and has its upper end pivotally connected to a hook-like member 107, the front end of which engages within a suitable hole in a small bracket 108 connected to the bottom of the tilting front member 30. The construction is such that the tilting front 30 is oscillated about its pivotal connection with the frame-like member 17 upon reciprocation of the rod 100. For facilitating movement of the rod 100, the rear end thereof is pivotally connected to a hand lever 110 intermediate its ends. The lower end of the lever 110 is pivotally connected as by a pivot pin 111 to angular brackets 112 fixed to the rear end of the support A.

It will be apparent from the above that a lens carried by the tilting front 30 can be moved or oscillated, as desired, from a position at the rear of the camera by proper manipulation of the hand levers 98, 110, which levers are located closer together and can be simultaneously moved by the same hand of the photographer.

From the foregoing, it will be apparent that the objects of the invention heretofore enumerated and others have been accomplished and that there has been provided a novel and improved studio camera, all of the focusing adjustments of which, including universal adjustment of the lens, can be effected by the photographer from the rear of the camera, thus permitting him to make the required adjustments while watching the ground glass upon which the object to be photographed is focused. While the preferred embodiment of the invention has been herein shown and described, it is to be understood that the invention is not limited to the particular construction and arrangement shown but may be otherwise embodied and it is my intention to cover hereby all adaptations, modifications and uses thereof which come within the practice of those skilled in the art to which the invention relates and within the scope of the appended claims.

Having thus described my invention, I claim:

1. In a camera of the character described, a camera bed or base, a frame member including top, bottom and side portions, pivotal means perpendicular to said bed or base for rotatably supporting the bottom portion of said frame member on said bed or base adjacent to its front end, a second frame member including top, bottom and side portions, means for rotatably supporting the side portions of said second frame member within said first frame member for movement about an axis at right angles to the axis about which said first frame member is rotatably supported, said second frame member being adapted to have a camera lens attached thereto, manual control means adjacent to the rear end of said bed or base and supported thereby, and means supported by said bed and operatively connecting said manual control means and the bottom portion of each of said frame members for selectively moving said frame members about their respective axes, said last mentioned means including a rotatable member extending lengthwise of said bed and having a gear segment thereon in mesh with a driven member connected to the bottom portion of said first mentioned frame member, and a slidable member extending lengthwise of said bed and connected to said second mentioned frame member, said manual control means being adapted to rotate said rotatable member and actuate said slidable member.

2. In a camera of the character described, a camera bed or base, a frame member including top, bottom and side portions, means for rotatably supporting the bottom portion of said frame member on said bed or base adjacent to its front end, a second frame member including top, bottom and side portions, means for rotatably supporting the side portions of said second frame member within said first frame member for movement about an axis at right angles to the axis about which said first frame member is rotatably supported, one of said axes being perpendicular to said bed or base, said second frame member being adapted to have a camera lens attached thereto, manual control means adjacent to the rear end of said bed or base and supported thereby, and means supported by said bed and operatively connecting said manual control means and the bottom portion of each of said frame members for selectively moving said frame members about their respective axes, said last mentioned means including a rotatable tube having a gear segment thereon in mesh with a driven member connected to the bottom portion of said first mentioned frame member, and a reciprocable rod positioned within said tube and connected to the bottom portion of said second mentioned frame member by suitable linkage, said tube being connected to said manual control means for rotation thereby, and said rod being connected to said manual control means for reciprocation thereby.

3. In a camera of the character described, a camera bed or base, a first frame member including top, bottom and side portions, pivotal means perpendicular to said bed or base for rotatably supporting the bottom portion of said first frame member on said bed or base adjacent to its front end, a second frame member including top, bottom and side portions, means for rotatably supporting the side portions of said frame member within the first frame member for movement about an axis at right angles to the axis about which said first frame member is rotatably supported, said second frame member being adapted to have a camera lens attached thereto, actuating means including rotatable and slidable means supported by said bed or base and extending lengthwise thereof from adjacent to the front end of said bed or base to adjacent the rear end of said bed or base, manual control means supported by said bed or base adjacent to the rear end of said bed or base and operatively connected to said actuating means adjacent its rear end, and means adjacent to the front end of said bed or base operatively connecting the forward end of said actuating means to the bottom portions of said frame members for moving one of said frame members about its axis upon the rotation of said actuating means and for moving the other of said frame members about its axis upon the sliding of said actuating means.

4. In a camera as described in claim 3, including friction means for retaining said frame members in rotative position to which they are moved.

MADISON GEDDES.

REFERENCES CITED

The following references are of record in the file of this patent:

UNITED STATES PATENTS

| Number | Name | Date |
|---|---|---|
| 439,804 | Lewis | Nov. 4, 1890 |
| 564,838 | Parradee | July 28, 1896 |
| 818,136 | Woodall | Apr. 17, 1906 |
| 1,142,904 | Morrell | June 15, 1915 |
| 1,535,225 | Hays et al. | Apr. 28, 1925 |
| 1,804,061 | Roth | May 5, 1931 |
| 1,911,142 | Cahill | May 23, 1933 |
| 2,293,598 | Drucker | Aug. 18, 1942 |
| 2,301,921 | Willcox | Nov. 17, 1942 |
| 2,310,850 | Grover | Feb. 9, 1943 |

FOREIGN PATENTS

| Number | Country | Date |
|---|---|---|
| 18,260 | Great Britain | of 1906 |
| 460,784 | Germany | June 5, 1928 |